United States Patent
Devarakonda

(10) Patent No.: US 9,664,094 B2
(45) Date of Patent: May 30, 2017

(54) SYSTEMS AND METHODS FOR MONITORING CATALYST DEACTIVATION AND CONTROLLING AN AIR/FUEL RATIO

(71) Applicant: General Electric Company, Schenectady, NY (US)

(72) Inventor: Maruthi Devarakonda, Waukesha, WI (US)

(73) Assignee: General Electric Company, Schenectady, NY (US)

(*) Notice: Subject to any disclaimer, the term of this patent is extended or adjusted under 35 U.S.C. 154(b) by 87 days.

(21) Appl. No.: 14/038,014

(22) Filed: Sep. 26, 2013

(65) Prior Publication Data

US 2015/0082773 A1 Mar. 26, 2015

(51) Int. Cl.
| | |
|---|---|
| *F01N 3/00* | (2006.01) |
| *F01N 11/00* | (2006.01) |
| *F01N 3/10* | (2006.01) |
| *F02D 41/14* | (2006.01) |
| *F01N 9/00* | (2006.01) |

(52) U.S. Cl.
CPC .......... *F01N 11/007* (2013.01); *F01N 3/101* (2013.01); *F01N 3/106* (2013.01); *F01N 9/005* (2013.01); *F02D 41/1441* (2013.01); *F02D 41/1453* (2013.01); *F02D 41/1454* (2013.01); *F01N 2550/02* (2013.01); *F01N 2560/021* (2013.01); *F01N 2560/025* (2013.01); *F01N 2900/1402* (2013.01); *F02D 2041/1419* (2013.01); *F02D 2041/1468* (2013.01); *Y02T 10/22* (2013.01); *Y02T 10/47* (2013.01)

(58) Field of Classification Search
CPC .......... F01N 3/20; F01N 11/007; F01N 3/101; F01N 3/106; F01N 9/005; F01N 2550/02; F01N 2560/021; F01N 2560/025; F01N 2900/1402; F02D 41/1441; F02D 41/1454; F02D 41/1453; F02D 2041/1419; F02D 2041/1468
USPC .......... 60/272–324; 436/37; 701/103
See application file for complete search history.

(56) References Cited

U.S. PATENT DOCUMENTS

| | | |
|---|---|---|
| 7,257,941 B1 | 8/2007 | Reuter |
| 8,302,378 B2 | 11/2012 | Miyoshi et al. |
| 2004/0107696 A1* | 6/2004 | Harrison et al. .......... 60/285 |

(Continued)

FOREIGN PATENT DOCUMENTS

| | | |
|---|---|---|
| EP | 2136046 A1 | 12/2009 |
| GB | 2391324 A | 2/2004 |
| WO | 2011093772 A1 | 8/2011 |

OTHER PUBLICATIONS

EP Search Report dated Oct. 20, 2015 regarding application No. 14185233.5-1606/2853725.

*Primary Examiner* — Mark Laurenzi
*Assistant Examiner* — Kelsey Stanek
(74) *Attorney, Agent, or Firm* — Ernest G. Cusick; Frank A. Landgraff

(57) ABSTRACT

A system for controlling an air/fuel ratio in an engine based on catalyst deactivation includes an $NH_3$ detector disposed downstream from the three way catalyst, and a subsystem that compares measured values of $NH_3$ concentration with a nominal value of $NH_3$ concentration at rich operating conditions. A subsystem adjusts the air/fuel ratio based on the measured value of $NH_3$ concentration and estimated CO concentration.

23 Claims, 3 Drawing Sheets

(56) References Cited

U.S. PATENT DOCUMENTS

2007/0234708 A1 10/2007 Jones et al.
2012/0311998 A1* 12/2012 Sun ..................... F01N 3/2073
                                                                                                         60/285

* cited by examiner

SYSTEMS AND METHODS FOR MONITORING CATALYST DEACTIVATION AND CONTROLLING AN AIR/FUEL RATIO

BACKGROUND OF THE INVENTION

The subject matter disclosed herein generally relates to monitoring a catalyst in an engine system and more particularly to methods and systems for continuously diagnosing a three way catalyst and taking corrective control action in the case of catalyst deactivation.

Environmental regulations require the use of catalysts to treat engine exhaust in order to reduce air pollution. A catalytic converter uses two types of catalysts, a reduction catalyst and an oxidation catalyst. The catalytic converter consists of a ceramic structure coated with a metal catalyst incorporated within a housing. The catalytic converter provides a structure that exposes the maximum surface area of catalyst to the exhaust stream.

A three-way catalytic converter has the capacity to store oxygen ($O_2$). When the air/fuel ratio of the exhaust is lean (oxidizing atmosphere), it stores $O_2$ and thereby suppresses the production of mono-nitrogen oxides (NOx). When the air/fuel ratio of the exhaust is rich, it releases the stored $O_2$ thereby accelerating the oxidation of hydrocarbons (HC) and carbon monoxide (CO).

In many applications, it is desirable to monitor the performance of the catalytic converter. Failure to detect catalyst deactivation on gas engines might result in severe financial penalties for the end-user. Monitoring may involve sensing the exhaust gases to determine whether the catalyst is performing adequately. Among the sensors used are $O_2$ sensors and NOx sensors. In the case of $O_2$, the sensors may be located upstream and downstream of the catalyst. Signals from the sensors are compared and correlated to the emissions to determine whether the catalyst is performing adequately.

Another approach to monitoring the performance of a catalytic converter is to sense the temperature of the catalytic converter. Usually two sensors will be fitted. One sensor is disposed upstream from the catalyst and the other sensor is disposed downstream from the catalyst. The sensors monitor the temperature rise over the catalytic converter core. When the temperature difference between the sensors is greatest, the catalytic converter is thought to be working optimally.

For a system having a three way catalyst combined with an ammonia slip catalyst and mid bed air injection, the engine is typically run with a rich air/fuel ratio. Running the engine rich achieves the benefit of reducing NOx in the three way catalyst and oxidizing CO and $NH_3$ in the ammonia slip catalyst. Three way catalysts lose performance when chemically deactivated. For example, oil exposure for a 4000 hour duration may chemically deactivate a three way catalyst. Such deactivation could result in CO and methane ($CH_4$) emissions increasing while $NH_3$ emissions decrease which could result in the engines being out of compliance with environmental regulations. Prior methodologies for monitoring catalytic converter performance are typically based on catalyst temperature and $O_2$ storage based diagnosis. As the engine is typically run rich in a mid-bed air injection scenario, $O_2$ storage based diagnosis will not be valid and hence, there is a need for an alternate way of monitoring the catalyst health.

BRIEF DESCRIPTION OF THE INVENTION

The disclosure provides a methodology for continuously diagnosing a three way catalyst and for taking corrective control action in the case of catalyst deactivation.

In accordance with one exemplary non-limiting embodiment, the invention relates to a method for controlling an air/fuel ratio in an engine. The method includes determining whether an actual value of the $NH_3$ concentration downstream from a three way catalyst is lower than a nominal value for the $NH_3$ concentration produced at rich operating conditions. If the actual value of the $NH_3$ concentration is lower than the nominal value for the $NH_3$ concentration produced at rich operating conditions, then the air/fuel ratio is adjusted based on an estimated CO concentration.

In accordance with another embodiment, a method for detecting deactivation of a catalyst is provided. The method includes determining whether an actual value of the $NH_3$ concentration downstream from a three way catalyst is lower than a nominal value for the $NH_3$ concentration produced at rich operating conditions. If the actual value of the $NH_3$ concentration is lower than the nominal value for the $NH_3$ concentration produced at rich operating conditions then the method determines an estimated CO concentration value. The estimated CO concentration value is then compared to a reference CO concentration value.

In another embodiment, a system for controlling an air/fuel ratio in an engine is provided. The system includes a three way catalyst, an $NH_3$ detector disposed downstream from the three way catalyst, and a subsystem that compares measured values of the $NH_3$ concentration with a nominal value of the $NH_3$ concentration at rich operating conditions. The system also includes a subsystem that adjusts the air/fuel ratio based on the measured value of $NH_3$ concentration and estimated CO concentration.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

The disclosure provides a methodology for continuously diagnosing a three way catalyst and for taking corrective control action in the case of catalyst deactivation. The technical effect is the ability to diagnose catalyst deactivation with a minimal number of sensors and to adjust the air/fuel ratio based on the catalyst deactivation.

Figure 1:
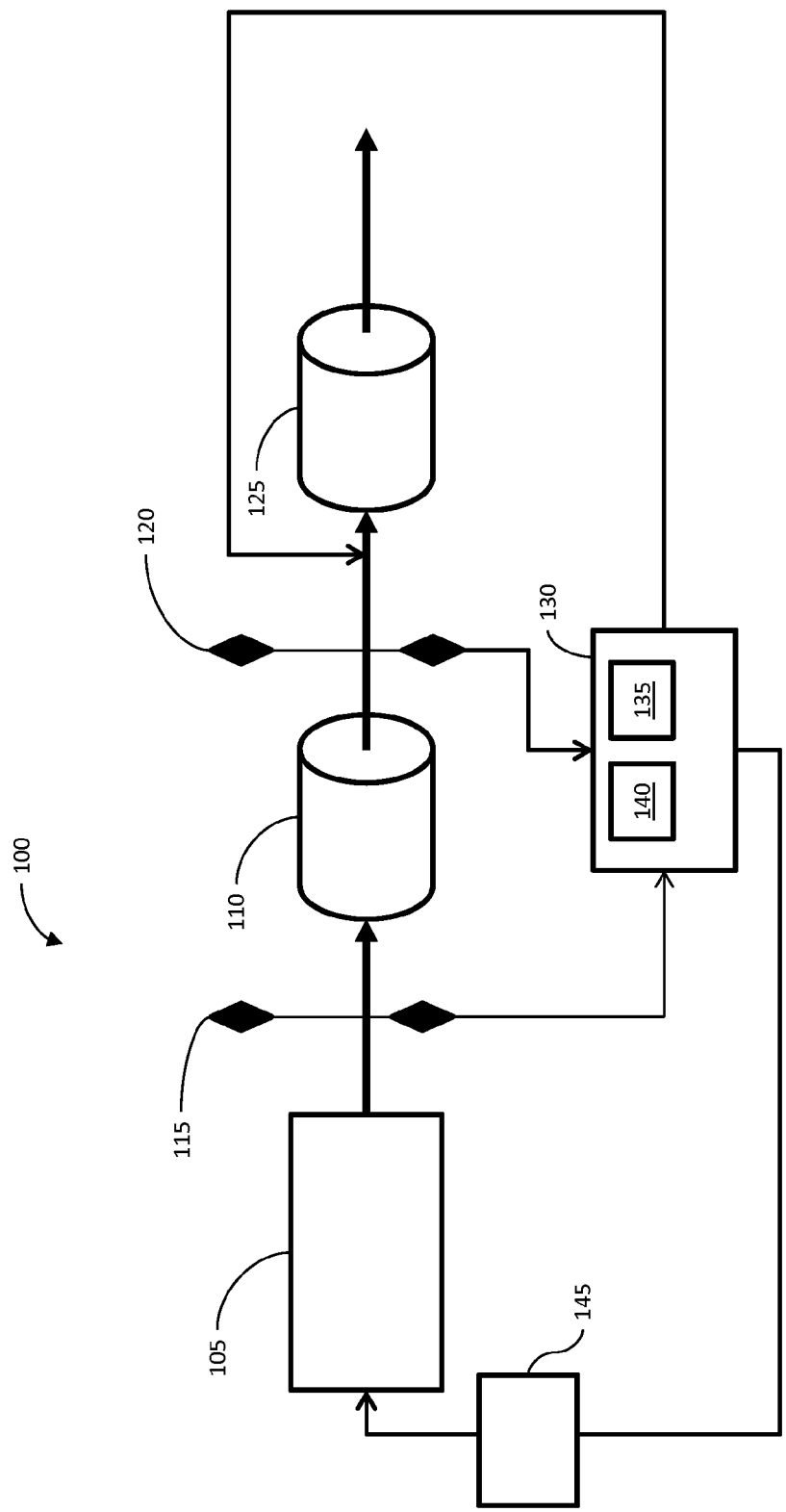
FIG. 1 is a schematic diagram of an embodiment of a system for diagnosing catalyst deactivation.

Illustrated in FIG. 1 is a schematic of a catalyst monitoring and control system (CMCS 100). As shown in FIG. 1, an engine 105 is provided with a three way catalyst 110. An $O_2$ sensor 115 may be provided downstream from the engine 105 and upstream from the three way catalyst 110. The $O_2$ sensor 115 measures the proportion of $O_2$ downstream from the engine 105. When information from the $O_2$ sensor 115 is coupled with information from other sources, it can be used to determine indirectly the air/fuel ratio and to estimate the CO content downstream of the three way catalyst 110. The CMCS 100 also may include an $NH_3$ sensor 120 disposed downstream from the three way catalyst 110 and upstream from an ammonia slip catalyst 125. The $NH_3$ sensor 120 may be an optical sensor such as an IR detector or an optic-fiberbased sensor. Alternately, the $NH_3$ sensor 120 may be a semiconductor sensor that measures the change in resistance or capacitance of a coating as a function of adsorbed species. The ammonia slip catalyst 125 selectively oxidizes $NH_3$ to elemental $N_2$ and $H_2$ in a certain catalyst operating window. The CMCS 100 includes a control subsystem 130 having a catalyst monitoring module 135, and a model based CO estimator 140. The model based CO estimator 140 may be a linear or non-linear observer estimator based on a physical model of the three way catalyst 110. Inputs to the model based CO estimator 140 include the gas flow rate, the catalyst inlet temperature and the inlet CO concentration. The output of the model based CO estimator 140 is, the CO concentration downstream of the three way catalyst 110. Inlet CO concentration may be obtained through a map of engine out CO (for example, as a function of the air/fuel equivalence ratio, lambda) or through a simple empirical correlation. The CMCS 100 also may include an air/fuel control subsystem 145 that adjusts the air/fuel ratio in response to control signals from the control subsystem 130.

In operation, the $NH_3$ sensor of the CMCS 100 senses a drop in the $NH_3$ content of the gas stream from the three way catalyst 110. The catalyst monitoring module 135 determines if the actual $NH_3$ content ($NH_{3,act}$) is less than a nominal value at rich operating conditions ($NH_{3,nom}$) Once a certain time averaged signal from the $NH_3$ sensor 120 shows consistent drop in the $NH_3$ concentration, the estimated CO concentration ($CO_{est}$) is determined from the model based CO estimator 140. $CO_{est}$ is compared to a reference CO concentration ($CO_{ref}$) derived from a map or a correlation to check for an increase in CO emissions. Once the rise in CO concentration is ascertained for a certain time duration, the air/fuel control subsystem 145 adjusts air/fuel ratio slightly leaner and the process is repeated until $NH_{3,act}$ is less than a threshold value $T_1$. The threshold value $T_1$. may be 10% of $NH_{3,nom}$. A leaner air/fuel ratio contains more air than a rich air/fuel ratio. A 'Stoichiometric' air/fuel ration has the exact amount of air and fuel necessary to produce a chemically complete combustion. For gasoline engines, the stoichiometric, air/fuel ratio is 14.7:1, which corresponds to 14.7 parts of air to one part of fuel. The stoichiometric air/fuel ratio depends on fuel type—for alcohol it is 6.4:1 and 14.5:1 for diesel. A lower air/fuel ratio number contains less air than the 14.7:1 stoichiometric air/fuel ratio, therefore it is a richer mixture. Conversely, a higher AFR number contains more air and therefore it is a leaner mixture.

Figure 2:
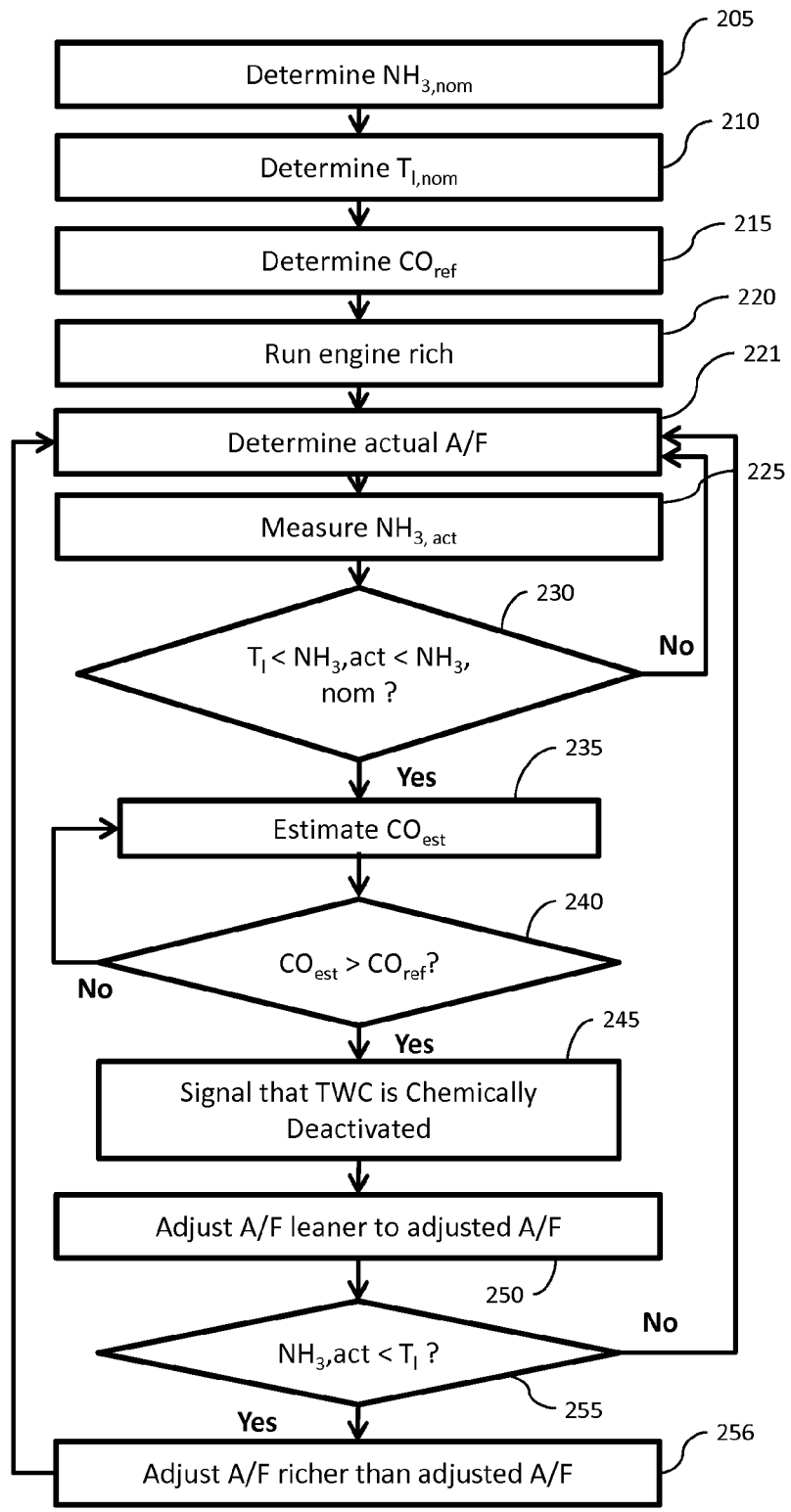
FIG. 2 is a flow chart of an embodiment of a method for controlling an air/fuel ratio based on catalyst deactivation.

Illustrated in FIG. 2 is a flow chart of a method 200 for controlling the air/fuel ratio of an engine 105 based on catalyst deactivation.

In step 205, the method 200 determines $NH_{3,nom}$.

In step 210, the method 200 determines a threshold $NH_3$ concentration $T_1$. The threshold $NH_3$ concentration may be set at a percentage of $NH_{3,nom}$. For example, $T_1=0.1*NH_{3,nom}$.

In step 215, the method 200 determines $CO_{ref}$. $CO_{ref}$ may be derived from a map or correlation.

In step 220, the engine 105 is run at rich operating conditions.

In step 221, the method 200 determines an initial air fuel ratio.

In step 225, the method 200 measures and determines $NH_{3,act}$. This may be accomplished through the $NH_3$ sensor 120.

In step 230, the method 200 may determine whether $NH_{3,act}$ is less than $NH_{3,nom}$. A drop in the $NH_3$ sensor signal $NH_{3,act}$ when compared to $NH_{3,nom}$ could be a first indicator of the degradation of the three way catalyst 110.

If $NH_{3,act}$ is greater than $NH_{3,nom}$ then the method 200 returns to step 220 where the method 200 measures and determines $NH_{3,act}$.

If $NH_{3,act}$ is less than $NH_{3,nom}$ and greater than $T_1$, then in step 235 the method 200 estimates $CO_{est}$. This may be accomplished with a model based CO estimator 140. The estimator can be a linear or non-linear observer based on a physical model of the three way catalyst 110. The observer or estimator is created by constructing a dynamical system associated with the system under consideration, in this case the three way catalyst 110. The role of the observer is to produce valid estimates of the state space variables of the original system, for example, CO concentrations downstream from the three way catalyst 110.

Once a certain time averaged signal from the $NH_3$ sensor 120 shows consistent drop, $CO_{est}$ is compared to $CO_{ref}$ to check for an increase in CO emissions. In step 240, the method 200 determines whether $CO_{est}$ is greater than $CO_{ref}$.

If $CO_{est}$ is less than or equal to $CO_{ref}$ then the method 200 returns to step 225 to determine whether $NH_{3,act}$ is less than $NH_{3,nom}$.

A value of $CO_{est}$ that is greater than $CO_{ref}$ is an indication that the three way catalyst 110 has been degraded (step 245).

In step 250, the method 200 adjusts the air/fuel ratio to an adjusted air/fuel ratio that is leaner than the initial air/fuel ratio.

In step 255, the method 200 determines whether $NH_{3,act}$ is less than $T_1$.

If $NH_{3,act}$ is less than $T_1$ the method 200 adjusts the air/fuel ratio to richer than the adjusted air/fuel ratio and returns to step 221 where the actual air/fuel ratio is determined. If $NH_{3,act}$ is greater than or equal to $T_1$ then the method 200 returns to step 221 where the actual air/fuel ratio is determined.

This invention provides a diagnosis method to detect chemical deactivation of a three way catalyst 110 in a mid-bed air injection system, and provides a corrective air/fuel ratio control action. A technical advantage includes the ability to diagnose catalyst deactivation with minimal number of sensors. Commercially, the approach could result in a reduction of costs associated with frequent emissions monitoring and avoidance of financial penalties which otherwise could be incurred due to catalyst deactivation.

Figure 3:
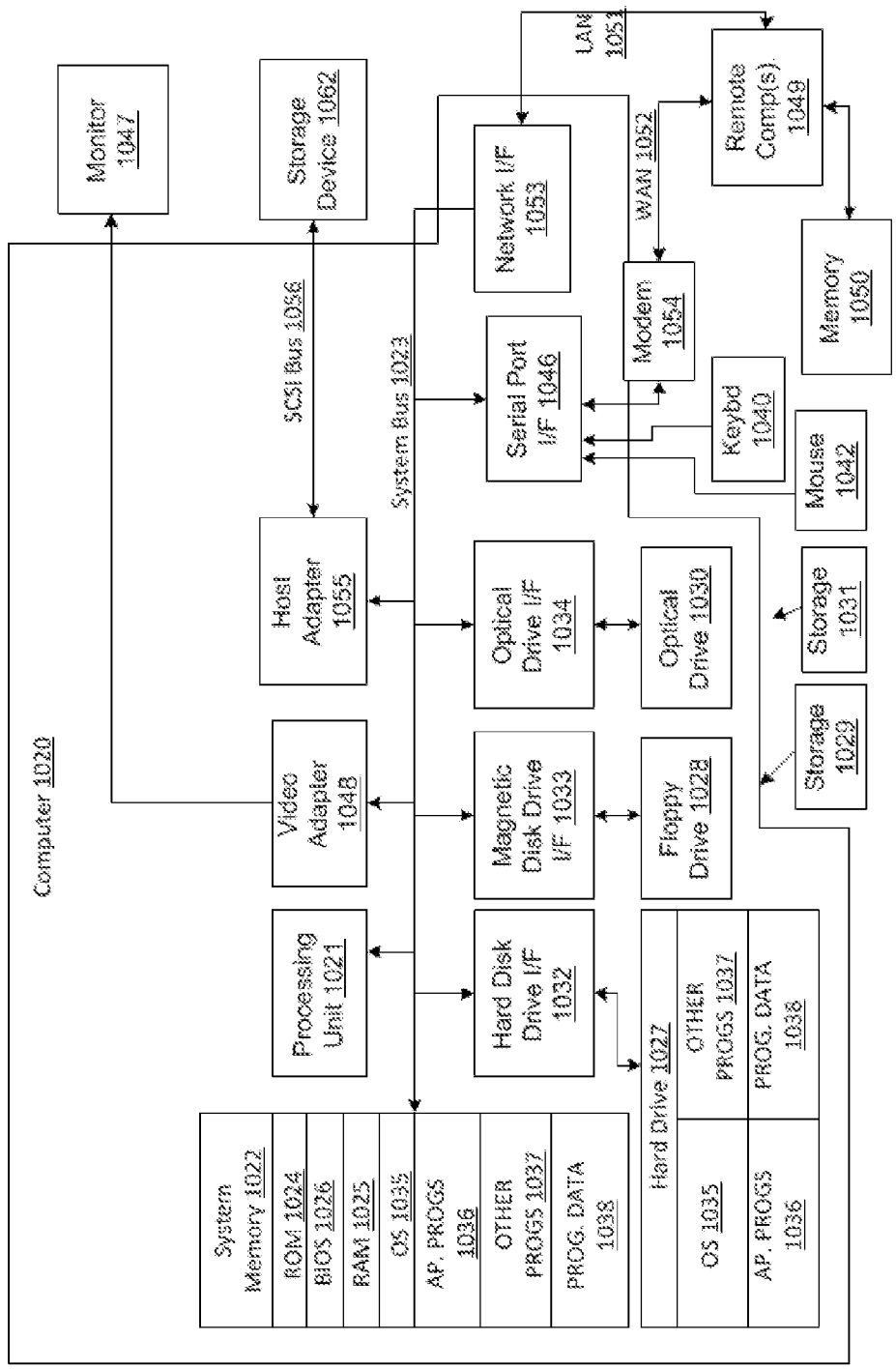
FIG. 3 is a block diagram of a general purpose computer.

FIG. 3 is a block diagram of a computer 1020 in which the control subsystem 130 may be incorporated. Computer 1020 includes a processing unit 1021, a system memory 1022, and a system bus 1023 that couples various system components including the system memory to the processing unit 1021. The system bus 1023 may be any of several types of bus structures including a memory bus or memory controller, a peripheral bus, and a local bus using any of a variety of bus architectures. The system memory includes read-only memory (ROM) 1024 and random access memory (RAM) 1025. A basic input/output system 1026 (BIOS), containing the basic routines that help to transfer information between elements within the computer 1020, such as during start-up, is stored in ROM 1024.

The computer 1020 may further include a hard disk drive 1027 for reading from and writing to a hard disk (not shown), a magnetic disk drive 1028 for reading from or writing to a removable magnetic disk 1029, and an optical disk drive 1030 for reading from or writing to a removable optical disk 1031 such as a CD-ROM or other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide non-volatile storage of computer readable instructions, data structures, program modules and other data for the computer 1020. As described herein, computer-readable media is an article of manufacture and thus not a transient signal.

Although the exemplary environment described herein employs a hard disk, a removable magnetic disk 1029, and a removable optical disk 1031, it should be appreciated that other types of computer readable media, which can store data that are accessible by a computer, may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, removable magnetic disk 1029, removable optical disk 1031, ROM 1024 or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner, or the like. These and other input devices are often connected to the processing unit 1021 through a serial port interface 1046 that is coupled to the system bus 1023, but may be connected by other interfaces, such as a parallel port, game port, or universal serial bus (USB). A monitor 1047 or other type of display device is also connected to the system bus 1023 via an interface, such as a video adapter 1048. In addition to the monitor 1047, a computer may include other peripheral output devices (not shown), such as speakers and printers. The exemplary system of FIG. 3 also includes a host adapter 1055, a Small Computer System Interface (SCSI) bus 1056, and an external storage device 1062 connected to the SCSI bus 1056.

The computer 1020 may operate in a networked environment using logical connections to one or more remote computers, such as a remote computer 1049. The remote computer 1049 may be a personal computer, a server, a router, a network PC, a peer device or other common network node, and may include many or all of the elements described above relative to the computer 1020, although only a memory storage device 1050 has been illustrated in FIG. 3. The logical connections depicted in FIG. 3 include a local area network (LAN) 1051 and a wide area network (WAN) 1052. Such networking environments are commonplace in offices, enterprise-wide computer networks, intranets, and the Internet.

When used in a LAN networking environment, the computer 1020 is connected to the LAN 1051 through a network interface or adapter 1053. When used in a WAN networking environment, the computer 1020 may include a modem 1054 or other means for establishing communication over the wide area network 1052, such as the Internet. The modem 1054, which may be internal or external, is connected to the system bus 1023 via the serial port interface 1046. In a networked environment, program modules depicted relative to the computer 1020, or portions thereof, may be stored in the remote memory storage device. It will be appreciated that the network connections shown are exemplary and other means of establishing a communication link between the computers may be used.

Computer 1020 may include a variety of computer readable storage media. Computer readable storage media may be any available media that can be accessed by computer 1020 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1020. Combinations of any of the above should also be included within the scope of computer readable media that may be used to store source code for implementing the methods and systems described herein. Any combination of the features or elements disclosed herein may be used in one or more embodiments.

Where the definition of terms departs from the commonly used meaning of the term, applicant intends to utilize the definitions provided below, unless specifically indicated.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A method for controlling an air/fuel ratio in an engine, the method comprising:
    operating the engine,
    generating a gas stream from the engine;
    passing the gas stream through a three way catalyst, and then passing the gas stream through a $NH_3$ sensor;
    determining, at the $NH_3$ sensor, whether an actual value of $NH_3$ concentration downstream from the three way catalyst is lower than a nominal value for $NH_3$ concentrations produced at rich operating conditions;
    if the actual value of $NH_3$ concentration is lower than the nominal value for $NH_3$ concentrations produced at rich operating conditions then, at an air/fuel control subsystem, adjusting the air/fuel ratio based on estimated CO concentrations.

2. The method for controlling an air/fuel ratio in an engine of claim 1, wherein determining whether an actual value of $NH_3$ concentration is lower than a nominal value for $NH_3$ concentrations produced at rich operating conditions comprises:
    establishing the nominal value for $NH_3$ concentrations produced at rich operating conditions;
    detecting the actual value of $NH_3$ concentration downstream from the three way catalyst; and
    comparing the actual value of $NH_3$ concentration downstream from the three way catalyst with the nominal value for $NH_3$ concentrations produced at rich operating conditions.

3. The method for controlling an air/fuel ratio in an engine of claim 1, wherein adjusting the air/fuel ratio based on estimated CO concentrations comprises:
    determining an actual air/fuel ratio;
    determining whether an actual CO concentration is greater than a reference CO concentration; and
    changing the air/fuel ratio when the actual CO concentration is greater than the reference CO concentration.

4. The method for controlling an air/fuel ratio in an engine of claim 3, wherein determining whether an actual CO concentration is greater than a reference CO concentration comprises:
    establishing a reference CO concentration value;
    estimating an actual CO concentration value; and
    comparing the actual CO concentration value to the reference CO concentration value.

5. The method for controlling an air/fuel ratio in an engine of claim 4, wherein estimating an actual CO concentration value comprises calculating the actual CO concentration value using a model-based estimator.

6. The method for controlling an air/fuel ratio in an engine of claim 3, wherein changing the air/fuel ratio comprises:
    adjusting the air/fuel ratio to an adjusted air/fuel ratio that is leaner than the actual air/fuel ratio.

7. The method for controlling an air/fuel ratio in an engine of claim 6, further comprising:
    establishing a lower threshold value for $NH_3$ concentrations;
    comparing the actual value of $NH_3$ concentration downstream from the three way catalyst with the lower threshold value for $NH_3$ concentrations;
    adjusting the air/fuel ratio to an air/fuel ratio that is richer than the adjusted air/fuel ratio if the actual value of $NH_3$ concentration downstream from the three way catalyst is lower than the lower threshold value for $NH_3$ concentrations; and
    if the actual value of $NH_3$ concentration downstream from the three way catalyst is greater than the lower threshold value for $NH_3$ concentrations then detecting actual value of $NH_3$ concentration downstream from a three way catalyst.

8. A method for detecting deactivation of a catalyst, the method comprising:
    operating an engine,
    generating a gas stream from the engine;
    passing the gas stream through a three way catalyst, and then passing the gas stream through an $NH_3$ sensor;
    determining, at the $NH_3$ sensor, whether an actual value of $NH_3$ concentration downstream in the gas stream from the three way catalyst is lower than a nominal value for $NH_3$ concentrations produced at rich operating conditions;
    if the actual value of $NH_3$ concentration is lower than the nominal value for $NH_3$ concentrations produced at rich operating conditions then determining an estimated CO concentration value;
    comparing the estimated CO concentration value to a reference CO concentration value for detecting deactivation of the three way catalyst; and
    sending one or more control signals to an air/fuel control subsystem based on the comparison of the estimated CO concentration value to the reference CO concentration value, wherein the air/fuel control subsystem is configured to adjust an air/fuel ratio based on the received control signals.

9. The method for detecting deactivation of a catalyst of claim 8, wherein determining an estimated CO concentration value comprises determining the estimated CO concentration value using a model-based estimator.

10. The method for detecting deactivation of a catalyst of claim 9, wherein the model-based estimator comprises an observer based on a physical model of the three way catalyst.

11. The method for detecting deactivation of a catalyst of claim 10, wherein the observer based on the physical model of the three way catalyst is a linear observer.

12. The method for detecting deactivation of a catalyst of claim 10, wherein the observer based on the physical model of the three way catalyst is a non-linear observer.

13. The method for detecting deactivation of a catalyst of claim 8, wherein determining whether an actual value of $NH_3$ concentration downstream from the three way catalyst is lower than a nominal value for $NH_3$ concentrations produced at rich operating conditions comprises determining whether a time averaged value of $NH_3$ concentration downstream from the three way catalyst is lower than the nominal value for $NH_3$ concentrations produced at rich operating conditions.

14. The method for detecting deactivation of a catalyst of claim 8, wherein the one or more control signals indicate that the three way catalyst is deactivated if the estimated CO concentration value is greater than the reference CO concentration value.

15. A system for controlling an air/fuel ratio in an engine, the system comprising:
    a three way catalyst;
    an $NH_3$ sensor disposed downstream from the three way catalyst;
    a control subsystem that compares a measured value of $NH_3$ concentration with a nominal value of $NH_3$ concentration at rich operating conditions; and
    an air/fuel control subsystem that adjusts the air/fuel ratio to the engine based on the measured value of $NH_3$ concentration and estimated CO concentrations.

16. The system for controlling an air/fuel ratio in an engine of claim 15, wherein the subsystem that adjusts the air/fuel ratio comprises:
    a subsystem that estimates a CO concentration downstream of the three way catalyst.

17. The system for controlling an air/fuel ratio in an engine of claim 16 wherein the subsystem that estimated a CO concentration comprises an observer based on a physical model of the three way catalyst.

18. The system for controlling an air/fuel ratio in an engine of claim 17 wherein the observer is a linear observer.

19. The system for controlling an air/fuel ratio in an engine of claim 17 wherein the observer is a non-linear observer.

20. The system for controlling an air/fuel ratio in an engine of claim 15, wherein the subsystem that adjusts the air/fuel ratio comprises:
a subsystem that compares an estimated value of CO concentration to a reference value of CO concentration.

21. A method for controlling an air/fuel ratio in an engine, the method comprising:
operating the engine;
generating a gas stream from the engine;
passing the gas stream through a three way catalyst, and then passing the gas stream through a $NH_3$ sensor;
determining, at the $NH_3$ sensor, whether an actual value of $NH_3$ concentration downstream from a three way catalyst is lower than a nominal value for $NH_3$ concentrations produced at rich operating conditions;
if the actual value of $NH_3$ concentration is lower than the nominal value for $NH_3$ concentrations produced at rich operating conditions then, at an air/fuel control subsystem, adjusting the air/fuel ratio based on estimated CO concentrations; wherein adjusting the air/fuel ratio based on estimated CO concentrations comprises:
determining an actual air/fuel ratio;
determining whether an actual CO concentration is greater than a reference CO concentration; and changing the air/fuel ratio when the actual CO concentration is greater than the reference CO concentration;
wherein determining whether an actual CO concentration is greater than a reference CO concentration comprises:
establishing a reference CO concentration value;
estimating an actual CO concentration value; and comparing the actual CO concentration value to the reference CO concentration value,
wherein estimating an actual CO concentration value comprises calculating an actual CO concentration using a model based estimator.

22. A method for detecting deactivation of a catalyst, the method comprising:
operating an engine,
generating a gas stream from the engine;
passing the gas stream through a three way catalyst, and then passing the gas stream through an $NH_3$ sensor;
determining, at the $NH_3$ sensor, whether an actual value of $NH_3$ concentration downstream in the gas stream from the three way catalyst is lower than a nominal value for $NH_3$ concentrations produced at rich operating conditions;
if the actual value of $NH_3$ concentration is lower than the nominal value for $NH_3$ concentrations produced at rich operating conditions then determining an estimated CO concentration value;
comparing the estimated CO concentration value to a reference CO concentration value for detecting deactivation of the three way catalyst; and
sending one or more control signals to an air/fuel control subsystem based on the comparison of the estimated CO concentration value to the reference CO concentration value, wherein the air/fuel control subsystem is configured to adjust an air/fuel ratio based on the received control signals,
wherein determining an estimated CO concentration value comprises determining an estimated CO concentration value using a model-based estimator.

23. A system for controlling an air/fuel ratio in an engine, the system comprising:
a three way catalyst;
an $NH_3$ sensor disposed downstream from the three way catalyst;
a control subsystem that compares a measured value of $NH_3$ concentration with a nominal value of $NH_3$ concentration at rich operating conditions; and
an air/fuel control subsystem that adjusts the air/fuel ratio to the engine based on the measured value of $NH_3$ concentration and estimated CO concentrations;
wherein the subsystem that adjusts the air/fuel ratio comprises:
a subsystem that estimates a CO concentration downstream of the three way catalyst, and
wherein the subsystem that estimates a CO concentration comprises an observer based on a physical model of the three way catalyst.

* * * * *